United States Patent [19]
Suzuki

[11] Patent Number: 6,152,421
[45] Date of Patent: Nov. 28, 2000

[54] VALVE BODY AND ELECTROMAGNETIC CONTROL VALVE USING THE SAME

[75] Inventor: Isao Suzuki, Tokyo, Japan

[73] Assignee: MKS Japan, Inc., Tokyo, Japan

[21] Appl. No.: 09/063,346

[22] Filed: Apr. 21, 1998

[30] Foreign Application Priority Data

Apr. 22, 1997 [JP] Japan .................................. 9-104610

[51] Int. Cl.[7] .................................................. F16K 31/02
[52] U.S. Cl. ..................... 251/129.15; 251/356; 251/368; 62/323
[58] Field of Search ............................. 251/129.15, 368, 251/356; 62/373

[56] References Cited

U.S. PATENT DOCUMENTS

| | | | |
|---|---|---|---|
| 4,275,569 | 6/1981 | Mayers et al. ............................. | 62/373 |
| 4,893,782 | 1/1990 | Franke ...................................... | 251/356 |
| 5,662,745 | 9/1997 | Takayama et al. ...................... | 251/368 |
| 5,937,884 | 8/1999 | Barnoin et al. ..................... | 251/129.15 |

*Primary Examiner*—A. Michael Chambers
*Assistant Examiner*—Thomas L. McShane
*Attorney, Agent, or Firm*—Wenderoth, Lind & Ponack, L.L.P.

[57] ABSTRACT

A valve body includes: a main body having a recess formed in a surface thereof facing a valve seat. A sealing member fills the recess of the main body. The sealing member is made of annealed nickel. The annealed nickel has a low hardness, so that the sealing member is slightly depressed by abutment thereof against the valve seat. The sealing member is then hardened by further application of stresses. Therefore, complete sealing between the sealing member and the valve seat can be achieved.

6 Claims, 3 Drawing Sheets

FLOW

FLOW

VALVE BODY AND ELECTROMAGNETIC CONTROL VALVE USING THE SAME

The present invention relates to a valve body which is advantageously used in an electromagnetic control valve in which a plunger is moved by an electromagnetic force. The present invention also relates to an electromagnetic control valve using the above-mentioned valve body.

A valve body used in an electromagnetic control valve is disclosed in, for example, Examined Japanese Patent Application Publication (Kokoku) No. 3-554, and comprises a main body having a recess in which a rubber material is filled. However, this valve body has a problem such that the rubber material melts or fractures due to contact with a particular type of gas used in producing semiconductors.

In order to solve this problem, a valve body utilizing Teflon, instead of rubber material, has been proposed. However, it has been found that Teflon also suffers corrosion in the presence of a particular type of gas, such as phosphine ($PH_3$).

On the other hand, it has been considered to use a valve body made completely of a metal which is resistant to gases. However, it is difficult to achieve complete sealing by abutment of such valve body on a valve seat, even when a mirror finish is achieved on the valve body in a surface thereof facing the valve seat. Even when both opposing surfaces of the valve body and the valve seat are plane surfaces, these plane surfaces are not completely parallel, so that a gap between opposing surfaces of the valve body and the valve seat cannot be completely eliminated by simple abutment. Especially, when the valve body made completely of a metal is applied to a valve operated by an electromagnetic force in which the valve body is moved by a pressure as low as 3 to 4 $kg/cm^2$, this pressure is not sufficiently high to eliminate the above-mentioned gap and therefore, complete sealing cannot be achieved.

BRIEF SUMMARY OF THE INVENTION

In order to solve the above-mentioned problems accompanying conventional valve bodies, the present invention has been made. It is an object of the present invention to provide a valve body which has high resistance to melting and corrosion due to gases and is capable of completely stopping a flow of fluid. It is another object of the present invention to provide an electromagnetic control valve utilizing the above-mentioned valve body.

According to the present invention, there is provided a valve body comprising: a main body having a recess formed in a surface thereof facing a valve seat; and a sealing member filled in the recess of the main body, wherein the sealing member is made of annealed nickel. Nickel as such prior to annealing is very hard. When a sealing member made of non-annealed nickel abuts against the valve seat, complete sealing between the sealing member and the valve seat cannot be achieved. In the present invention, as the material for the sealing member, annealed nickel is used. Annealed nickel has a low hardness as compared to non-annealed nickel. Therefore, when the sealing member made of annealed nickel abuts against the valve seat, the sealing member is slightly depressed, so that complete sealing between the sealing member and the valve seat can be achieved. Further, because nickel suffers neither melting nor corrosion due to contact with gases used in producing semiconductors, the sealing member has high durability.

In the valve body of the present invention, the sealing member may be aged due to pressure applied thereto when the sealing member repeatedly abuts against the valve seat. As mentioned above, annealed nickel has a low hardness as compared to non-annealed nickel, so that the sealing member made of annealed nickel is slightly depressed by abutment thereof against the valve seat. When the sealing member is aged under pressure due to abutment thereof against the valve seat, the hardness of the sealing member, which has been lowered by annealing, becomes high again. Thus, as a result of aging, the sealing member hardens in a configuration which eliminates a clearance between the sealing member and the valve seat, to thereby achieve complete sealing.

In the valve body of the present invention, the sealing member may be made of annealed nickel exhibiting a Brinell hardness of 10 or less. When the hardness of sealing member is in the above-mentioned range, slight depression of the sealing member due to abutment thereof against the valve seat surely occurs, to thereby achieve complete sealing.

According to the present invention, there is also provided an electromagnetic control valve comprising: a valve body; a valve seat facing the valve body; a plunger adapted to move so that the valve body abuts against the valve seat; and an electromagnetic coil adapted to generate an electromagnetic force for moving the plunger, wherein the valve body comprises a main body having a recess formed in a surface thereof facing the valve seat and a sealing member filled in the recess of the main body, the sealing member being made of annealed nickel. The electromagnetic control valve is operated by an electromagnetic force, so that a driving force for moving the plunger is small and therefore, it is difficult to achieve complete sealing by using a valve body made completely of a metal which is generally employed for a valve body. However, in the electromagnetic control valve of the present invention arranged as mentioned above, the hardness of the sealing member made of nickel is lowered by annealing, so that the sealing member is slightly depressed by abutment thereof against the valve seat and hence, complete sealing can be achieved. Further, nickel suffers neither melting nor corrosion due to contact with gases used in producing semiconductors, the sealing member has high durability.

DETAILED DESCRIPTION OF THE INVENTION

Figure 1:
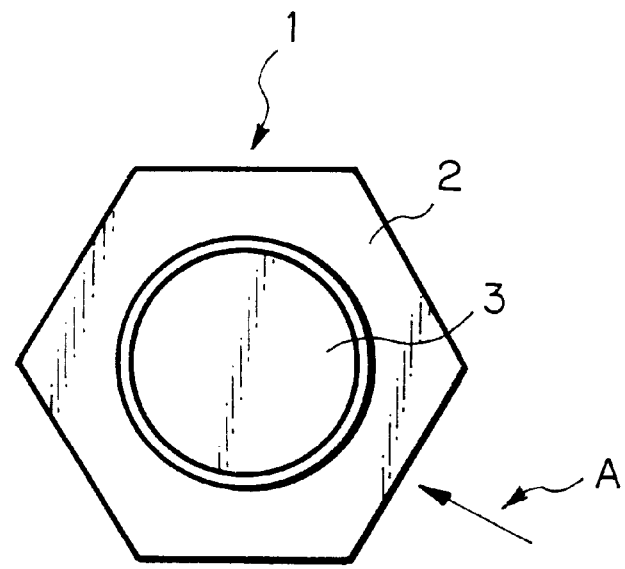
FIG. 1 is a plan view of a valve body according to a preferred embodiment of the present invention.

Hereinbelow, explanation is made of a valve body according to a preferred embodiment of the present invention and an electromagnetic control valve using this valve body, with reference to the accompanying drawings. In the drawings, like parts and portions are designated by like reference numerals and overlapping is avoided with respect to explanation of these parts and portions.

Figure 2:
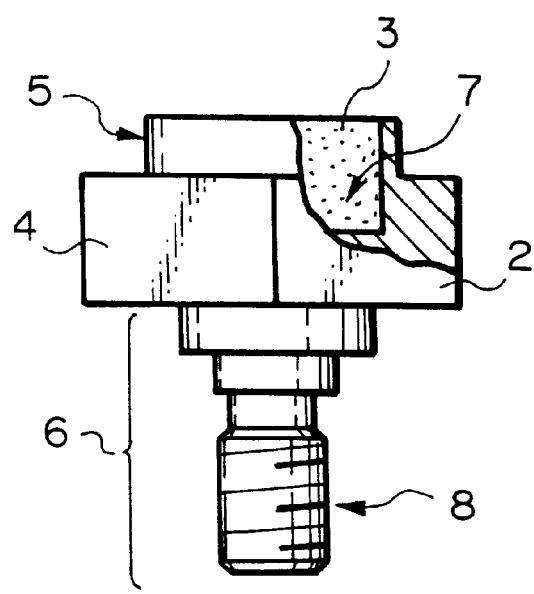
FIG. 2 is a partially cut-away cross-section side view of the valve body of FIG. 1, as viewed a direction indicated by the arrow A.

FIG. 1 is a plan view of a valve body 1 according to a preferred embodiment of the present invention. FIG. 2 is a partially cut-away cross-sectional side view of the valve body 1 of FIG. 1 as viewed in a direction indicated by the arrow A. The valve body 1 comprises a main body 2 made of, for example, stainless steel (SUS316) and a sealing member 3.

The main body 2 comprises a body portion 4 in the form of a column having a hexagonal cross-section, a head portion 5 in the form of a column having a circular cross-section formed on an upper surface of the body portion 4, and a leg portion 6 formed on the body portion 4 on a surface thereof on a side opposite the head portion 5. The leg portion 6 is obtained in a form such that columns having circular cross-sections are stacked in order of outwardly decreasing diameter.

A cylindrical recess 7 is formed over a large area on an upper surface of the head portion 5. External threads 8 are formed in an outer circumferential surface of a forward end of the leg portion 6. The external threads 8 are adapted to engage internal threads of a plunger.

In the valve body 1, a sealing member 3 made of annealed nickel in the form of a disk conforming to the recess 7 is fitted in the recess 7 and fixed by staking. As the annealed nickel constituting the sealing member 3, nickel which has been annealed at 7,000° C. under a high vacuum of $10^{-6}$ Torr or more is used. The nickel which has been annealed in the above-mentioned manner exhibits a Brinell hardness as low as 10 or less, which is lower than that of nickel which has been annealed by a conventional annealing method. Prior to annealing, nickel is drawn into a bar or is rolled into a plate by a conventional production process. At that time, nickel exhibits a Brinell hardness of about 78.

Figure 3:
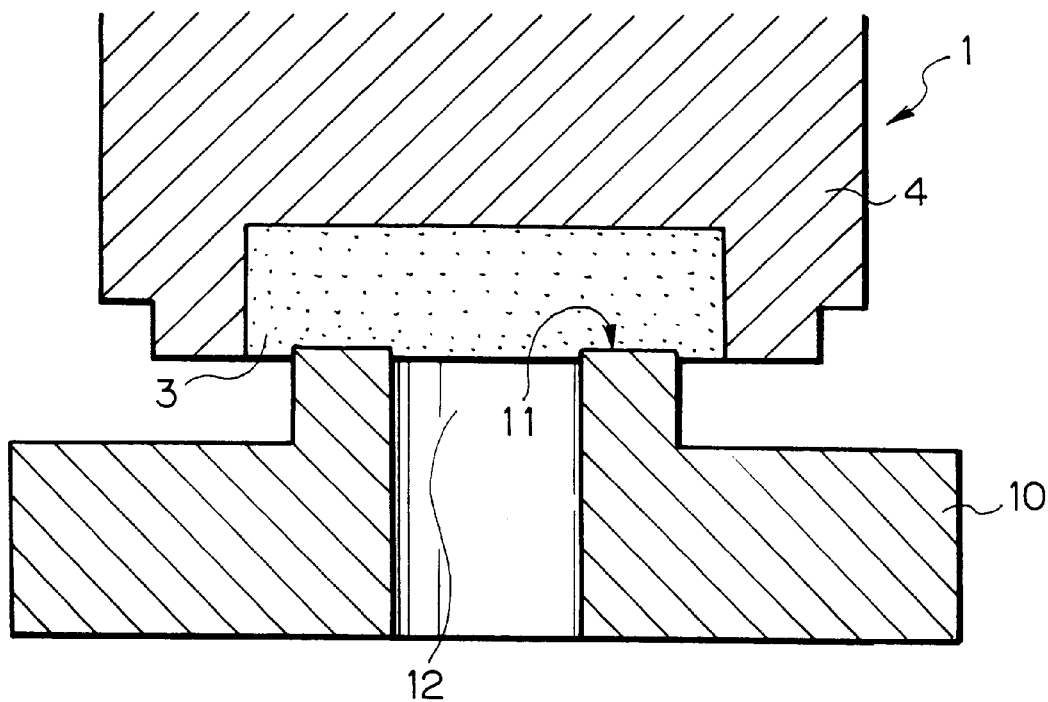
FIG. 3 is a cross-sectional view for explaining an operation of the valve body according to the preferred embodiment of the present invention.

The valve body 1 arranged as mentioned above receives a force of the plunger and abuts against a valve seat 10 shown in FIG. 3 to thereby close an orifice 12. The valve seat 10, which is made of SUS 316, has a hardness extremely higher than that of the sealing member 3 made of annealed nickel. Therefore, an abutting portion 11 of the valve seat 10 depresses the sealing member 3 in the recess 7 by a pressure of the plunger, to thereby completely seal the orifice 12. Nickel suffers neither melting nor corrosion due to various gases used in producing semiconductors, so that a flow rate of gas can be stably controlled.

Figure 4:
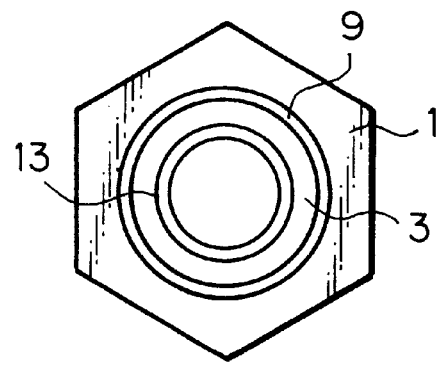
FIG. 4 is a plan view of an aged valve body according to the preferred embodiment of the present invention.

After the valve body 1 abuts against the valve seat 10 as mentioned above, the valve body 1 is moved away from the valve seat 10 and abuts against the valve seat 10 again, in accordance with movement of the plunger. When the above-mentioned abutment of the valve body 1 against the valve seat 10 is repeated several times, the hardness of the sealing member 3, which has been lowered by annealing under high vacuum, becomes high at a portion abutting against the abutting portion 11 of the valve seat 10. Consequently, as shown in FIG. 4, the portion of the sealing member 3 which has been depressed by the abutting portion 11 becomes a groove or depression 13. The reason why the hardness of the sealing member 3 becomes high is due to the phenomenon that, when a stress is applied to annealed metal, the annealed metal hardens at a portion thereof which receives the stress.

Thus, the valve body 1 hardens in a configuration which completely seals the orifice 12 in the valve seat 10. Therefore, the valve body 1 is always capable of appropriately stopping the flow of fluid.

Figure 5:
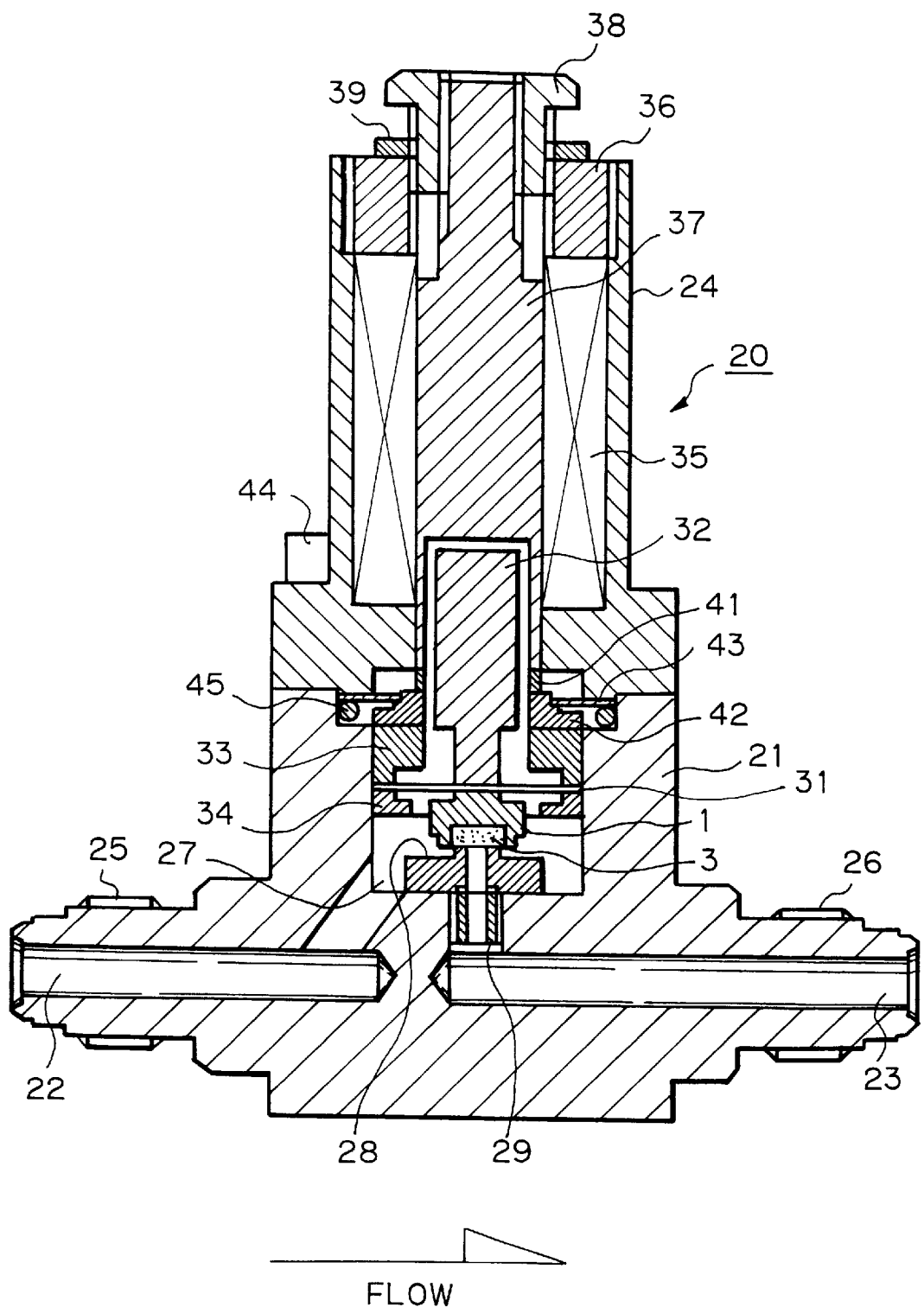
FIG. 5 is a cross-sectional view of an electromagnetic control valve according to a preferred embodiment of the present invention.

The valve body 1 shown in FIGS. 1 and 2 or the valve body 1 shown in FIGS. 3 and 4 is applied to an electromagnetic control valve 20 shown in FIG. 5. The electromagnetic control valve 20 comprises a base 21 having an inlet 22 and an outlet 23 for a fluid and a coil case 24 covering the base 21.

Outer circumferential surfaces of the inlet 22 and the outlet 23 of the base 21 are provided with threads 25 and 26, respectively, so that each of the inlet 22 and the outlet 23 can be connected to a pipe or the like for a flow of fluid. Further, the base 21 has a cylindrical valve chamber 27 formed at a central portion thereof. The valve chamber 27 has a hole at a bottom thereof, which communicates with the outlet 23. A cylinder 29 for securing a valve seat 28 is fitted in the hole at the bottom of the valve chamber 27. The valve seat 28 comprises a disk-shaped main body portion and an abutting portion projecting from the main body portion toward the valve body 1. The main body portion has formed in a back surface thereof a recess adapted to have the cylinder 29 fitted therein.

The valve body 1 is secured, using a screw, to a plunger 32 with a spring 31 being provided therebetween. The spring 31 is held at a predetermined position in the valve chamber 27 by means of block members 33 and 34. The plunger 32 and the valve body 1 are capable of moving vertically with the spring 31 being provided therebetween.

With respect to the coil case 24, an electromagnetic coil 35 is contained in a chamber defined by an outer wall and an inner wall, each having a cylindrical form, and is shielded from the outside by a cap 36. A shaft 37 extends through the coil case 24 at a central portion thereof. An outer circumferential surface of a head portion of the shaft 37 is formed with threads which are adapted to engage an adjusting nut 38. The shaft 37 is vertically moved by turning the adjusting nut 38 so as to adjust a gap between the plunger 32 and the shaft 37. A securing nut 39 is engaged with an outer circumferential surface of the adjusting nut 38. After the gap between the plunger 32 and the shaft 37 is adjusted by the adjusting nut 38, the adjusting nut 38 can be secured by the securing nut 39.

The coil case 24 is connected to the base 21 with an O-ring 45 being provided therebetween, by using a screw 44. The connection between the base 21 and the coil case 24 is fluid-tightly sealed by a ring 41, a block member 42 and a diaphragm 43.

In the electromagnetic control valve 20 arranged as mentioned above, in which the valve body 1 having a construction as shown in FIGS. 1 and 2 or FIGS. 3 and 4 is used, although the pressure applied by the electromagnetic force is lower than the pressure applied by a piezo element, the sealing member 3 is depressed so as to cover the abutting portion 11 of the valve seat 10 and therefore, the orifice 12 in the valve seat 10 can be completely sealed. In addition, nickel suffers neither melting nor corrosion due to various gases used in producing semiconductors, so that a flow rate of gas can be stably controlled.

As mentioned above, nickel as such prior to annealing is very hard. When a sealing member made of non-annealed nickel abuts against the valve seat, complete sealing between the sealing member and the valve seat cannot be achieved. In the valve body of the present invention, which comprises a main body having a recess formed in a surface thereof facing a valve seat and a sealing member filled in the recess of the main body, the sealing member is made of annealed nickel. Annealed nickel has a low hardness as compared to non-annealed nickel. Therefore, when the sealing member made of annealed nickel abuts against the valve seat, the sealing member is slightly depressed, so that complete sealing between the sealing member and the valve seat can be achieved. Further, because nickel suffers neither melting nor corrosion due to contact with gases used in producing semiconductors, the sealing member has high durability.

In the valve body of the present invention, the sealing member may be aged due to pressure applied thereto when the sealing member abuts against the valve seat. As mentioned above, annealed nickel has a low hardness as compared to non-annealed nickel, so that the sealing member made of annealed nickel is slightly depressed by abutment thereof against the valve seat. When the sealing member is aged under pressure due to abutment thereof against the valve seat, the hardness of the sealing member, which has been lowered by annealing, becomes high again. Thus, a result of aging, the sealing member hardens in a configuration which eliminates a clearance between the sealing member and the valve seat, to thereby achieve complete sealing.

In the valve body of the present invention, the sealing member may be made of annealed nickel exhibiting a Brinell hardness of 10 or less. When the hardness of sealing member is in the above-mentioned range, slight depression of the sealing member due to abutment thereof against the valve seat surely occurs, to thereby achieve complete sealing.

The electromagnetic control valve of the present invention comprises: a valve body; a valve seat facing the valve body; a plunger adapted to move so that the valve body abuts against the valve seat; and an electromagnetic coil adapted to generate an electromagnetic force for moving the plunger. In the electromagnetic control valve of the present invention, the valve body comprises a main body having a recess formed in a surface thereof facing the valve seat and a sealing member filled in the recess of the main body, and the sealing member is made of annealed nickel. The electromagnetic control valve is operated by an electromagnetic force, so that a driving force for moving the plunger is small and therefore, it is difficult to achieve complete sealing by using a valve body made completely of a metal which is generally employed for a valve body. However, in the electromagnetic control valve of the present invention arranged as mentioned above, the sealing member is made of annealed nickel having a low hardness, so that the sealing member is slightly depressed by abutment thereof against the valve seat and hence, complete sealing can be achieved. Further, nickel suffers neither melting nor corrosion due to contact with gases used in producing semiconductors, the sealing member has high durability.

What is claimed is:

1. A valve body comprising:
    a main body having a recess formed in a surface thereof facing a valve seat; and
    a sealing member filled in said recess of the main body, said sealing member being made of nickel which is annealed to lower its hardness and then is aged by being abutted against said valve seat due to pressure applied to said seating member.

2. A valve body according to claim 1, wherein said sealing member is made of annealed nickel exhibiting a Brinell hardness of 10 or less.

3. A valve body according to claim 1, wherein said sealing member has therein a depression resulting from contact with said valve seat.

4. An electromagnetic control valve comprising:
    a valve body;
    a valve seat facing said valve body;
    a plunger adapted to move so that said valve body abuts against said valve seat;
    an electromagnetic coil adapted to generate an electromagnetic force for moving said plunger; and
    said valve body comprising a main body having a recess formed in a surface thereof facing said valve seat and a sealing member filled in said recess of the main body, said sealing member being made of nickel which is annealed to lower its hardness and then is aged by being abutted against said valve seat due to pressure applied to said sealing member.

5. An electromagnetic control valve according to claim 4, wherein said sealing member is made of annealed nickel exhibiting a Brinell hardness of 10 or less.

6. An electromagnetic control valve according to claim 4, wherein said sealing member has therein a depression resulting from contact with said valve seat.

* * * * *